United States Patent [19]

Akabane et al.

[11] Patent Number: 4,840,308
[45] Date of Patent: Jun. 20, 1989

[54] AUTOMOTIVE AIR CONDITIONING SYSTEM DAMPER POSITION CONTROL

[75] Inventors: Hidemitsu Akabane, Takasaki; Toshimi Isobe, Isesaki; Seiichi Hoshino, Nitta, all of Japan

[73] Assignee: Sanden Corporation, Gunma, Japan

[21] Appl. No.: 220,740

[22] Filed: Jul. 18, 1988

[30] Foreign Application Priority Data

Jul. 18, 1987 [JP] Japan .................... 62-109593[U]

[51] Int. Cl.[4] .......................... G05D 23/12
[52] U.S. Cl. ......................... 236/13; 165/43
[58] Field of Search ............ 62/244; 236/13; 165/42, 165/43

[56] References Cited

U.S. PATENT DOCUMENTS 4,456,055 6/1984 Yoshimi et al. .................. 62/244 X
4,611,755 9/1986 Mayanoga et al. .................. 236/13
4,671,073 6/1987 Oki ................................. 62/244 X

*Primary Examiner*—William E. Tapolcai
*Attorney, Agent, or Firm*—Banner, Birch, McKie & Beckett

[57] ABSTRACT

An automotive air conditioning system is provided which includes a damper position control device which controls the angular position of an air mix damper. The air mix damper controls the mixture of cool air and heated air to thereby control the temperature of air blown into a compartment by the air conditioning system. The damper position control device further includes a motor actuator which drive the air mix damper and a control circuit. The motor actuator includes a drive motor for the air mix damper and a rotation control device including a regulator which regulates the upper and lower rotational limits of the shaft of the drive motor and a position detector which detects the rotational angle of the shaft. The control circuit controls the motor actuator in accordance with a plurality of detected signals, such as an inside temperature signal, an outside temperature signal, etc. The control circuit is also responsive to position signals generated by the position detector which correspond to the upper and lower limitation of the rotational angle of the motor. The control circuit initiates control of the operation of the motor actuator upon inputting one of the position signals corresponding to the upper and lower rotational limits. The control circuit then determines whether the motor stops within the range of the upper and lower rotational limits. A signal from the position detector at the position at which the motor stops is used by the control circuit as one of the rotational limits of the regulator.

2 Claims, 2 Drawing Sheets

AUTOMOTIVE AIR CONDITIONING SYSTEM DAMPER POSITION CONTROL

TECHNICAL FIELD

This invention relates to an automotive air conditioning system, and more particularly, to a damper position control device for an automotive air conditioning system in which the temperature of the air blown into a compartment is automatically controlled in accordance with the angular position of an air mix damper.

BACKGROUND OF THE INVENTION

In a conventional automotive air conditioning system of the type which includes an automatic temperature control function, a temperature control circuit is normally provided to control the angular position of an air mix damper to thereby control the temperature of the air blown into a compartment. By controlling the angular position of the air mix damper, the temperature control circuit adjusts the mixture of cool air and heated air directed to the compartment. The temperature control circuit computes the desired open angular position of the air mix damper as a function of a predetermined temperature, an outside air temperature and an inside air temperature.

The air mix damper generally is rotatably driven by a drive device such as a motor actuator which is responsive to control signals generated by the temperature control circuit. However, in rotating the air mix damper to a predetermined angular position, the motor actuator is subject to upper and lower rotational limits corresponding to the permissible range of rotation of the air mix damper. The motor actuator includes a drive motor, a regulator which regulates the angular position of the air mix damper in accordance with these upper and lower rotational limits and a position detecting device, such as a variable resistor, which generates position signals provided to the temperature control circuit and corresponding to the rotational limits of the air mix damper.

In the above prior art motor actuators, a relative position lag occurs between the position signals provided by the position detector or variable resistor and the upper and lower rotational limits of the regulator. In addition, the resistive value of such variable resistors is not always certain. Accordingly, a well-known technique to improve the accuracy of the position signals is to forcedly operate the motor actuator upon turning on the air conditioning system. The position signals of the motor actuator at the upper and lower rotational limits of the regulator are input to the temperature control circuit, and used to control the angular position of the air mix damper.

Despite the above improvement, differences in the stroke of the air mix damper and the motor actuator still occurred since the lengths of the rods and links which connect the air mix damper with the motor actuator could not always be precisely determined. Furthermore, if an error occurred upon connection of the air mix damper to the motor actuator, the motor actuator might not be driven to its upper or lower rotational limits even if the air mix damper is completely closed or open. In this case, the drive motor of the motor actuator could lock, and thereafter the temperature control circuit could not control the motor actuator. Additionally, the drive motor could be destroyed if current is continuously supplied to the motor over a long period of time.

SUMMARY OF THE INVENTION

It is an object of this invention to provide a damper position control device for an automotive air conditioning system which can suitably control the temperature of air blown into a compartment by controlling the angular position of an air mix damper.

It is another object of this invention to provide a damper position control device for an automotive air conditioning system which can prevent destruction of a motor actuator.

An automotive air conditioning system according to the present invention includes a damper position control device which controls the angular position of an air mix damper. The air mix damper controls the mixture of cool air and heated air to thereby control the temperature of air blown into a compartment by the air conditioning system. The damper position control device further includes a motor actuator which drives the air mix damper and a control circuit. The motor actuator includes a drive motor for the air mix damper and a rotation control device including a regulator which regulates the upper and lower rotational limits of the shaft of the drive motor and a position detector which detects the rotational angle of the shaft. The control circuit controls the motor actuator in accordance with the plurality of detected signals, such as an inside temperature signal, an outside temperature signal, etc. The control circuit also is responsive to position signals generated by the position detector which correspond to the upper and lower limitation of the rotational angle of the motor.

The control circuit initiates control of the operation of the motor actuator upon inputting one of the position signals corresponding to the upper and lower rotational limits. The control circuit then determines whether the motor stops within the range of the upper and lower rotational limits. A signal from the position detector at the position at which the motor stops is used by the control circuit as one of the rotational limits of the regulator.

Further objects, features and other aspects of this invention will be understood from the detailed description of the preferred embodiment of this invention.

DETAILED DESCRIPTION OF THE PREFERRED EMBODIMENT

Figure 1:
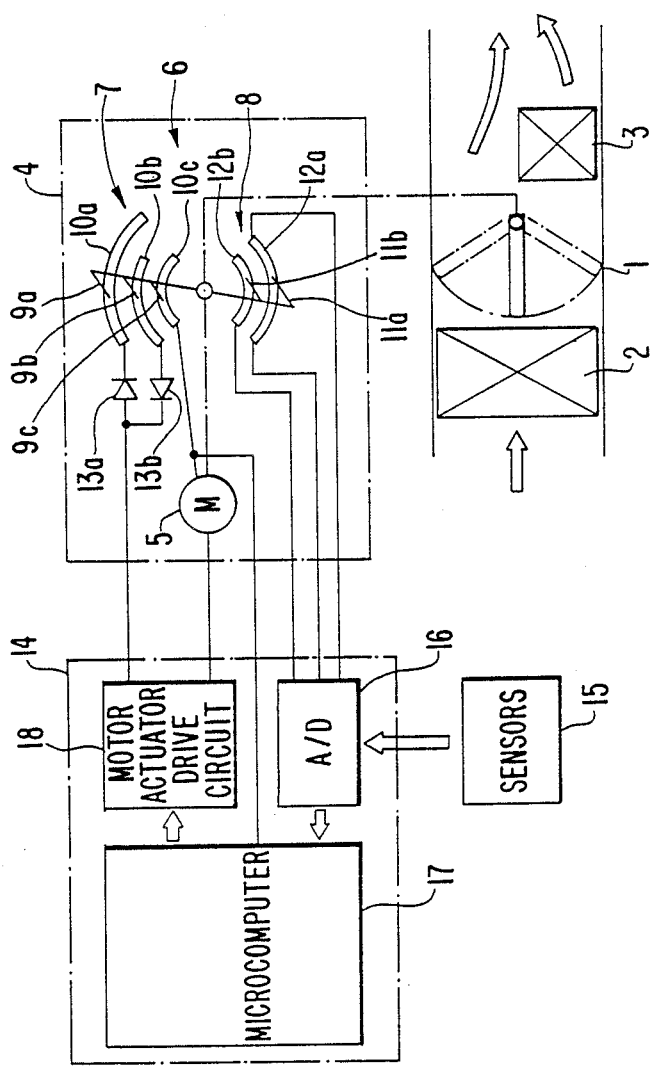
FIG. 1 is a schematic view of an automotive air conditioning system in accordance with the preferred embodiment of this invention.

With reference to FIG. 1, a schematic view of an air conditioning system which includes an automotive damper position control device is shown. Air mix damper 1 is disposed between evaporator 2 and heater core 3 in an air flow channel in which air flows in a path from evaporator 2 past air mix damper 1 and heater core 3. Air mix damper 1 controls the volume of air that flows to heater core 3 as a function of its angular position to thereby control the temperature of the air exiting the air flow channel. The damper position control device includes motor actuator control circuit 14, sensors 15 and motor actuator 4 which is operatively connected to air mix damper 1 through a wire or link to vary the angular position of air mix damper 1.

Motor actuator 4, which is a conventional device, comprises motor 5 and rotation control device 6 which controls the rotation of the drive shaft of motor 5. The drive shaft of motor 5 is operatively connected to air mix damper 1 through a wire or link. Rotation control device 6 includes regulator 7 which regulates the upper and lower rotational limits of the drive shaft of motor 5 and position detector 8 which provides signals indicative of the rotational angle of the drive shaft of motor 5.

Regulator 7 includes movable contacts 9a, 9b and 9c and fixed contacts 10a, 10b and 10c. Movable contacts 9a, 9b and 9c are rotationally driven in accordance with the rotation of the drive shaft of motor 5, and fixed contacts 10a, 10b and 10c are in contact with movable contacts 91, 9b and 9c. Fixed contacts 10a, 10b and 10c are resistance elements formed in an arc shape. The upper and lower rotational limits of the drive shaft of motor 5 are regulated by connections between fixed contacts 10a and 10b and movable contacts 9a and 9b. Fixed contacts 10a and 10b are coupled with motor actuator control circuit 14 through diodes 13a and 13b, each of which has an opposite polarity. Fixed contact 10c is coupled with motor actuator control circuit 14 through motor 5.

Position detector 8 comprises movable contacts 11a and 11b and fixed contacts 12a and 12b. Movable contacts 11a and 11b are rotationally driven in accordance with the rotation of the drive shaft of motor 5, and fixed contacts 12a 12b contact movable contacts 11a and 11b. Since fixed contacts 12a 12b are formed of a resistive material, rotation of the drive shaft of motor 5 varies the resistance of position detector 8. This variable resistance varies in accordance with the rotational angle of the shaft of motor 5, and is coupled to motor actuator control circuit 14 to provide a signal to control circuit 14 indicative of the rotational angle of the drive shaft of motor 5.

Motor actuator control circuit 14, which includes A/D converter 16, microcomputer 17 and motor actuator drive circuit 18, automatically controls the temperature of the air blown into a compartment associated with the air flow channel containing evaporator 2 and heater core 3 by operation of motor actuator 4 in accordance with a prescribed control program stored in memory of the microcomputer. Sensors 15, which are coupled to motor actuator control circuit 14, included sensors such as an inside temperature sensor, an outside temperature sensor, an evaporator temperature sensor, a thermosensor for measuring the water temperature in heater core 3, an isolation sensor, and a sensor responsive to the predetermined temperature selected by the user of the air conditioning system. The signals from sensors 15 and the position signals from position detector 8 are input to microcomputer 17 via A/D converter 16. Microcomputer 17 then sends control signals in accordance with the control program to motor actuator 4 through motor actuator drive circuit 18.

Figure 2:
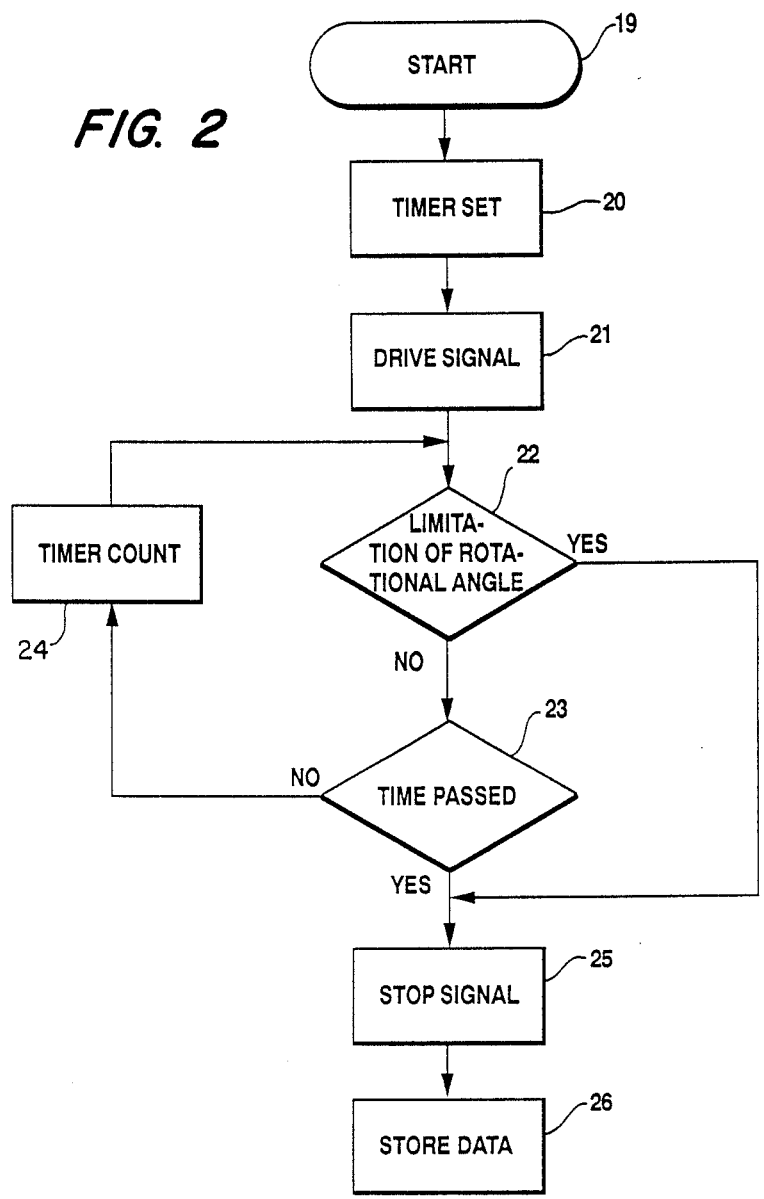
FIG. 2 is a flow chart for describing operation of the automotive air conditioning system as shown in FIG. 1.

With reference to FIG. 2, a flow chart describing operation of the control program of motor actuator control circuit 14 is shown. After the air conditioning system is turned on at step 19, a first timer is set for a first predetermined time period at step 20. At step 21, a drive signal is sent to motor actuator drive circuit 18 to drive motor 5. At step 22, a determination is made whether the rotational angle of the shaft of motor 5 is positioned at the lower rotational limit of regulator 7. If the rotational angle of the shaft of motor 5 is positioned at the lower rotational limit of regulator 7, control jumps to step 25. At step 25, a stop signal is output to motor actuator drive circuit 18, which stops operation of motor 5 of motor actuator 4. Control then proceeds to step 26 at which data from position detector 8 is stored in the memory of microcomputer 17 to identify the condition when the rotational angle of the shaft of motor 5 is positioned at the lower rotational limit of regulator 7. In the next control cycle, microcomputer 17 then controls motor actuator 4 in accordance with the stored data for the lower rotational limit of regulator 7.

At step 22, if the shaft of motor 5 is not positioned at the lower rotational limit of regulator 7, control proceeds to step 23. At step 23, a determination is made whether the first predetermined time period of the first timer initialed at step 21 has elapsed. If the first predetermined time period has not elapsed, control passes to step 24. At step 24, a second timer times a second predetermined timer period, and after the second predetermined time period elapses, control returns from step 24 to step 22, and the operations described above are repeated. Otherwise, at step 23, if it is determined that the first predetermined time period has elapsed, control passes to step 25. At step 25, a stop signal is output to motor actuator drive circuit 18, which stops operation of motor 5 of motor actuator 4. Control then passes from step 25 to step 26, and the data from position detector 8 is stored in the memory of microcomputer 17.

In the automotive air conditioning system of the present invention, even when motor 5 of motor actuator 4 is locked, and cannot move until the lower rotational limit of regulator 7 is determined, position control of motor actuator 4 by motor actuator control circuit 14 is accomplished by using the position at which motor actuator 4 is locked as the lower rotational limit of regulator 7. Additionally, unlike conventional systems, when motor 5 of motor actuator 4 cannot move but the lower rotational limit of regulator 7 has not been reached, a drive signal is not continuously output by motor actuator control circuit 14 to prevent destroying motor 5.

Although the above description of FIG. 2 is directed to determining the lower rotational limit of motor actuator 4, this description is equally applicable to determining the upper rotational limit of motor actuator 4. The operation of microcomputer 17 of motor actuator control circuit 14 in determining the upper rotational limit is basically the same.

This invention has been described in detail in connection with the preferred embodiment, but this embodiment is for example only, and the invention should not be construed as limited thereto. It should be apparent to those skilled in the art that other variations or modifications can be made within the scope of this invention.

We claim:

1. In an automotive air conditioning system including an air mix damper which controls the temperature of the air blown into a compartment to be cooled by controlling the mixture of cool air and heated air and a damper position control device, said damper position control device including a motor actuator and a control circuit, said motor actuator including a motor driving the air mix damper and a rotation control switch provided with a regulator regulating upper and lower rotational limits of said motor and a position detector generating position signals corresponding to the rotational angle of the shaft of said motor, said control circuit controlling the operation of said motor actuator in accordance with a plurality of temperature signals, and the position signals, said control circuit initiating control of the operation of said motor actuator upon inputting one of the position signals corresponding to the upper and lower rotational limits of the shaft of said motor, the improvements comprising:

stop determination means in said control circuit for determining whether said motor stops within the upper and lower rotational limits;

regulator control means in said control circuit responsive to said stop determination means for using a position signal from said position detector corresponding to the position at which said motor stops as one of the upper and lower rotational limits of said regulator.

2. An automatic air conditioning system in accordance with claim 1 wherein said control circuit is a microcomputer.

* * * * *